United States Patent

[11] 3,624,310

[72] Inventor Charles J. Mathey
Arlington Heights, Ill.
[21] Appl. No. 878,834
[22] Filed Nov. 21, 1969
[45] Patented Nov. 30, 1971
[73] Assignee Motorola, Inc.
Franklin Park, Ill.

[54] TAPE PLAYER PHONOGRAPH ADAPTER PERMITTING OPERATION OF TAPE CARTRIDGES OR CASSETTES ON CONVENTIONAL PHONOGRAPH

11 Claims, 7 Drawing Figs.

[52] U.S. Cl. .......... 179/100.1 A, 179/100.2 Z
[51] Int. Cl. .......... G11b 1/00, G11b 23/04
[50] Field of Search .......... 179/100.1 A, 100.2 Z, 6 AC, 1 C, 2 C, 100.41 C

[56] References Cited

UNITED STATES PATENTS

| | | | |
|---|---|---|---|
| Re.20,213 | 12/1936 | Sawyer | 179/100.41 PE |
| 1,641,947 | 9/1927 | Scully | 179/100.11 |
| 1,854,219 | 4/1932 | Owens | 179/100.11 |
| 2,521,476 | 9/1950 | Owens | 179/100.1 A |
| 2,936,342 | 5/1960 | Kallmann | 179/100.2 |
| 2,938,965 | 5/1960 | Tutchings | 179/100.2 |

FOREIGN PATENTS

| | | | |
|---|---|---|---|
| 446,750 | 11/1967 | Switzerland | 179/100.11 |

*Primary Examiner*—Bernard Konick
*Assistant Examiner*—Raymond F. Cardillo, Jr.
*Attorney*—Mueller & Aichele

ABSTRACT: An adapter for enabling the playing of tape cartridges or tape cassettes on a conventional phonograph record player is driven by the turntable of the phonograph record player and fits over the spindle of the record player, with power for driving the capstan used to advance the tape being obtained from rotation of a driven turntable in the adapter. The coupling to the phonograph amplifier is accomplished by driving an inverted phonograph cartridge which is linked mechanically to the existing phonograph cartridge in the record player.

PATENTED NOV 30 1971
3,624,310
FIG. 1, FIG. 2
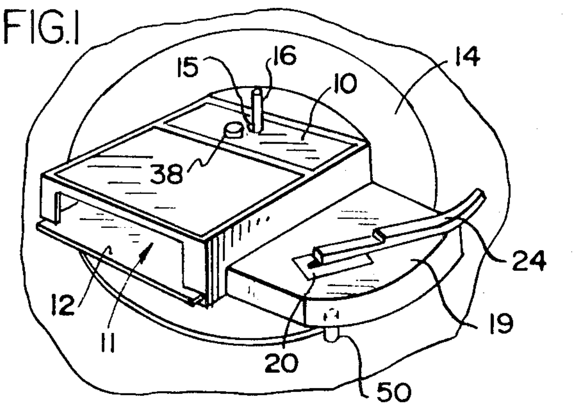
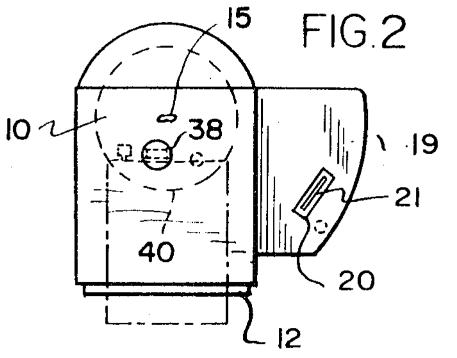
FIG. 3
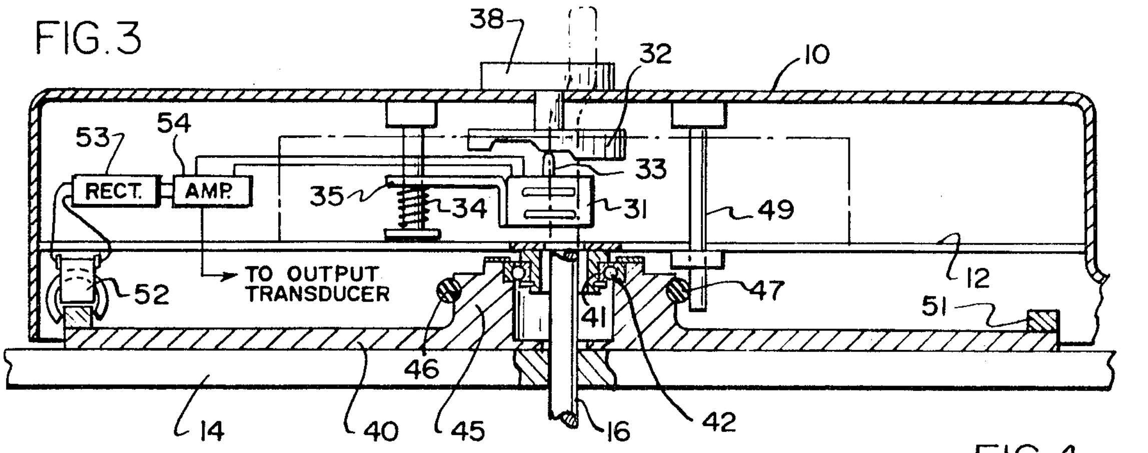
FIG. 4
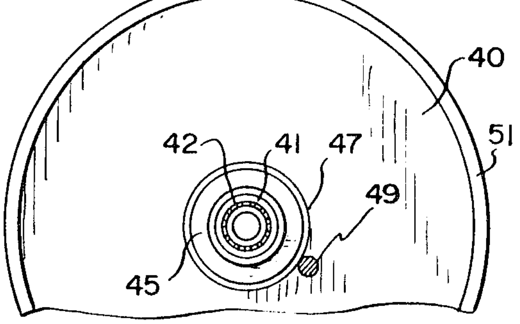
FIG. 5
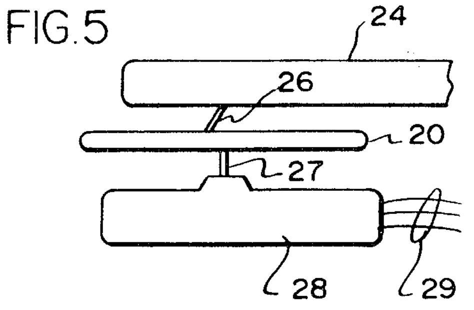
FIG. 6
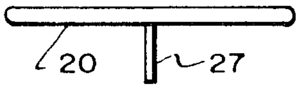
FIG. 7
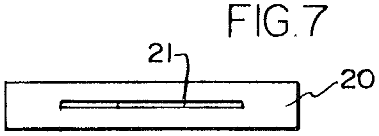
INVENTOR.
CHARLES J. MATHEY
BY Mueller, Lichele & Reuner
ATTORNEYS.

TAPE PLAYER PHONOGRAPH ADAPTER PERMITTING OPERATION OF TAPE CARTRIDGES OR CASSETTES ON CONVENTIONAL PHONOGRAPH

BACKGROUND OF THE INVENTION

At the present time, cartridge and cassette tape players are extensively used in automobiles and other reproducing systems. The cartridges and cassettes are simple to store, and the players are easy to operate. In order to play the cartridges or cassettes in a home reproduction system, however, it is necessary to use an independent tape player. Thus, it is desirable to provide a means for adapting an existing phonograph record player for the playing of tape cartridges or tape cassettes. Such an adapter should be easy to use, require a minimum of external connections, and be of low cost.

SUMMARY OF THE INVENTION

Accordingly, it is an object of this invention to provide a phonograph adapter for operating tape cartridges and cassettes.

It is another object of this invention to provide a phonograph adapter for enabling the playing of tape cartridges or cassettes on a conventional phonograph, with the necessary power for operating the adapter being derived from the rotation of the phonograph turntable.

In accordance with a preferred embodiment of this invention, an adapter for enabling the operation of tape cartridges or cassettes on a conventional phonograph record player, having a record turntable and a pickup arm with a phonograph cartridge and a needle, includes a housing for the tape transducer apparatus which consists at least of a cartridge-receiving chamber, a tape transducer head, and a tape-driving capstan. In the adapter housing, a driven turntable is rotatably mounted and is positioned to rest on and be rotated by the record turntable when the housing is placed on the record turntable, with the driven turntable supporting the housing on the record turntable. Rotation of the driven turntable in turn provides for rotation of the capstan through a coupling means.

In the embodiment operated as a tape player, the output of the tape transducer head is used to drive an output transducer means which is coupled through a phonograph-needle-receiving means to receive the record player phonograph needle for vibrating the same in accordance with the output of the tape transducer head.

BRIEF DESCRIPTION OF THE DRAWING

FIG. 1 is a perspective view of an adapter in accordance with a preferred embodiment of the invention;

FIG. 1 is a top view of the adapter shown in FIG. 1;

FIG. 3 is a partially cutaway end view showing some of the details of the adapter shown in FIG. 1;

FIG. 4 is a top view, partially cutaway, illustrating the capstan drive mechanism of the apparatus shown in FIG. 3; and FIGS. 5, 6 and 7 show details of the output transducer used in conjunction with the apparatus shown in FIGS. 1, 2 and 3.

DETAILED DESCRIPTION

Referring now to the drawing, wherein the same reference numbers are used throughout the several views to designate the same or similar components, there is shown a tape player adapter for enabling the playing of tape cartridges or cassettes by a conventional phonograph recorder player or changer. The adapter includes a housing 10 having a cartridge/cassette-receiving chamber 11 for receiving standard eight-track stereophonic tape cartridges, tape cassettes, or the like. The cartridges or cassettes are of conventional types, and the dimensions of the receiving chamber 11 are the standard dimensions ordinarily used in cartridge or cassette tape players.

The housing 10 includes a cartridge-supporting plate 12 which is located intermediate the top and bottom of the adapter housing 10 and provides a platform for supporting tape cartridges inserted into the chamber 11. The housing 10 is adapted to be placed over the turntable 14 of a conventional record player or changer and includes an opening 15 for receiving the spindle 16 of the record player or changer. As viewed in FIG. 1, the spindle 16 extends through the opening 15 and provides a means for locating the adapter housing 10 over the turntable 14.

On the right side of the housing 10, as viewed in FIGS. 1 and 2, there is a platform extension 19, having an opening on the upper surface in which is located an output transducer plate 20, having a phonograph-needle-receiving slot 21 located therein. The slot 21 is located relative to the spindle 16, when the adapter 10 is placed on the turntable, so as to intercept the arc traveled by the needle 26 carried by a pickup arm 24 of the phonograph record player with which the adapter is to be used. Due to the fact that the pickup arms 24 of different record players do not travel along exactly the same arc, it is necessary to provide a generally longitudinal slot 21 in the plate 20.

To couple the adapter output to the record player, the tone arm 24 is then moved into position so that the needle 26 for the tone arm 24 rests in the slot 21. The plate 20 carries on its underside an extension 27 (most clearly shown in FIG. 5), which is mounted in an inverted output phonograph cartridge 28 in place of a phonograph needle. The cartridge 28 is supplied with input signals over leads 29 which are provided with the amplified audio output of the tape player located within the adapter. As a result, the output phonograph cartridge 28 is used as an electrical-to-mechanical transducer to vibrate the extension 27 and, thus, the plate 20 in accordance with the signals applied to it. The vibrations of the plate 20 then are translated to the phonograph pickup needle 26 which responds to the vibrations in the same manner as if the phonograph needle were being used to reproduce the recording on a disc-type phonograph record.

Located within the adapter 10 is a conventional cartridge (or cassette) tape player reproducing mechanism and amplifier system. As shown in FIG. 3, the mechanism is a cartridge mechanism including a transducer head 31 which may be positioned to any of four positions corresponding to the four pairs of tracks recorded on the tape of a standard eight-track stereo cartridge. The vertical location of the head 31 relative to the tape in a cartridge is controlled by means of a cam 32 which has four different cam surfaces thereon with the reproducing head 31 having a cam follower 33 which rides on the surfaces of the cam 32. The follower 33 is biased into engagement with the cam surfaces by means of a compression spring 34 which forces the head-carrying bracket 35 upwardly, as viewed in FIG. 3. To determine which of the surfaces on the cam 32 is used to position the head 31, the cam 32 may be rotated manually by a knob 38 located on the upper surface of the adapter housing. In addition, the cam 32 may be electrically positioned in a well-known manner by a pawl and rachet mechanism operated in response to conductive strips on the tapes used in standard cartridges.

When the adapter is placed over the spindle 16, a driven turntable 40, which is rotatable mounted by means of a bearing 42 in a bracket 41 connected to the lower surface of the plate 12, rests on the turntable 14 of the record player. As seen in FIG. 3, the sidewalls of the housing 10 of the adapter are spaced above the turntable 14, so that the driven turntable 40 located within the adapter provides the support for the adapter on the turntable 14. The lower surface of the turntable 40 may be of rubber or some other material providing a high friction contact with the upper surface of the turntable 14, so that a positive driving link between the turntable 14 and 40 is effected. Thus, when the turntable 14 is rotated, the turntable 40 within the adapter 10 also is rotated at the same speed. An opening is provided in the center of the turntable 40 and the bracket 41 to permit the offset spindle 16 to pass therethrough.

The turntable 40 also includes a wide center hub portion 45 having a groove 46 in which is placed a rubber O ring 47. The width of the hub 45 and the O ring 47 is chosen to be sufficient to cause the O ring 47 to engage the lower end of a capstan 49, forming the driving capstan of the tape player mechanism in the adapter. The location of the capstan 49 relative to the hub 45 may best be seen in FIG. 4. Rotation of the turntable 40 by the turntable 14 then causes a corresponding rotation of the capstan 49, which is used in a conventional manner to advance the tape through a cartridge past the head 31.

Although the O ring 47 mounted in the groove 46 is shown directly driving the capstan 49, it may be necessary in some applications, due to the restrictions of the relative locations of the parts, to employ a conventional speed-changing gear or belt assembly between the capstan 49 and the O ring 47 in order to obtain the proper driving speed for the capstan 49. It is apparent, however, that whichever type of drive mechanism is used, that is the direct drive shown in FIGS. 3 and 4 or a speed-changing gear box, the proper speed for driving the capstan 49 will be attained at only one of the several speeds at which the turntable 14 may be driven in a conventional record player.

In order to prevent the turntable 14 from rotating the entire adapter assembly when the turntable 40 is rotated, a downwardly extending pin 50 is mounted in the extension 19 and extends into an opening in the top surface of the cabinet of the record player on which the turntable 14 is mounted. It may be necessary to drill a hole corresponding to the location of the pin 50 in the top surface of the record player cabinet. In the alternative, an extension which engages the record-positioning arm used in record changers, the offset location of the phonograph spindle, or some other suitable means may be provided for preventing the rotation of the adapter 10.

Since the rotation of the turntable 14 provides the mechanical power necessary for rotating the capstan 49, the electric motor and flywheel normally utilized in a cartridge-type tape player need not be provided in the adapter. As a consequence, the electrical power requirements of the adapter are quite low; and in order to provide a self-contained unit requiring no electrical connections, an alternately magnetized ring 51 may be mounted on the inner surface of the driven turntable 40 along the outer edge. The ring 51 consists of a continuous sequence of opposite magnetic poles, and a pickup coil 52 is mounted on the bottom surface of the plate 12 to intercept the alternating magnetic field of the ring 51 when the turntable 40 is rotated. This alternating field then produces a AC voltage in the pickup coil 52, with this AC voltage being applied to a rectifier/filter 53, which in turn supplies the necessary DC operating voltage to a conventional audio amplifier circuit 54 used to amplify the audio signals obtained from the reproducing head 31.

Although the alternately magnetized ring 51 and pickup coil 52, operating in conjunction with the rectifier 53, are shown producing the necessary electrical power for driving the amplifier 54, a conventional generator or a battery power supply could be employed to provide the necessary DC operating voltage for the amplifier 54. When the amplifier 54 is a transistorized amplifier, the power required is in the milliwatt range so that either a battery-operated device or the generator device shown in FIG. 3 may be utilized to provide sufficient power.

The amplified audio signals obtained from the amplifier 54 then are applied to the output phonograph cartridge 28 over the leads 29, as shown in FIG. 5 and described previously. It should be noted that the adapter requires no external connections in order to enable its use with the record player. Output signals are obtained by merely placing the phonograph pickup arm in the slot 21 of the plate 20, and control of the volume and tone of the reproduced signal may be effected by the controls already present in the record player.

The control knob 38 utilized to select the program material by positioning the cam 32 to locate the reproducing head 31 to different sets of tracks on the tape, also may be provided with an "off" position. In this position, the control may be utilized to disengage the drive mechanism between the turntable 40 and the capstan 49 and additionally to disengage the cartridge latch (not shown) which conventionally is used in conjunction with cartridge-type tape players for holding the cartridge firmly against the capstan of the player. A cartridge latch disengagement feature reduces the forces necessary to insert and withdraw the cartridge, but the phonograph spindle 16 normally is sufficiently strong to withstand these forces so that the cartridge latch disengagement feature is not necessary although it may be desirable.

We claim:

1. An adapter for enabling the operation of tape cartridges or cassettes on a conventional phonograph record player having a record turntable and a tone arm with a phonograph cartridge and a needle, said adapter including in combination:

a housing for tape transducer apparatus having a cartridge/cassette-receiving chamber and including at least a tape transducer head and a tape-driving capstan;

driven turntable means rotatably mounted in the housing and positioned to be rotated by the record turntable when the housing is placed on the record turntable;

means coupled with the driven turntable means for rotating the tape-driving capstan; and means coupled with the tape transducer head for vibrating said needle in accordance with the output of such head.

2. The combination according to claim 1 wherein said record player has a center spindle and wherein the housing for tape transducer apparatus has a locating aperture therein for receiving the center spindle of the phonograph record player, with said locating aperture serving to locate the housing on the record turntable.

3. An adapter for enabling the operation of tape cartridges or cassettes on a conventional phonograph record player having a record turntable and tone arm with a phonograph cartridge and a needle, said adapter including in combination:

a housing for tape reproducing apparatus having a cartridge/cassette-receiving chamber and including at least a tape reproducing head and a tape-driving capstan;

driven turntable means rotatably mounted in the housing and positioned to rest on and be rotated by the record turntable when the housing is placed on the record turntable, the driven turntable means supporting the housing on the record turntable;

means coupled with the driven turntable means for rotating the tape-driving capstan;

output transducer means for providing a representation of the output of the tape reproducing head;

means for coupling the tape reproducing head with the output transducer means; and needle-receiving means coupled with the output transducer means for receiving the record player needle for vibrating said needle in accordance with the output of the tape reproducing head.

4. The combination according to claim 3 wherein the output transducer means includes an output phonograph cartridge driven by input signals obtained from the means coupling the tape reproducing head with the output transducer means.

5. The combination according to claim 4 wherein the needle-receiving means includes a substantially flat plate having a needle-receiving groove therein, with the plate including an extension connected to the output phonograph cartridge for vibration thereby.

6. The combination according to claim 3 wherein said record player has a center spindle and wherein the housing for the tape reproducing apparatus has a locating aperture therein for receiving the center spindle of the phonograph record player, with said locating aperture serving to locate the housing on the record turntable, the housing further including means for supporting the needle-receiving means at a predetermined distance from the locating aperture along the arc normally traversed by the needle of the phonograph record player.

7. The combination according to claim 6 wherein the needle-receiving means includes a plate having a substantially longitudinal needle-receiving slot with said slot being substantially perpendicular to the arc normally traversed by the needle in the record player.

8. The combination according to claim 7 wherein the output transducer means includes an output phonograph cartridge supplied with input signals form the means coupling the tape reproducing head with the output transducer means, and wherein the output phonograph cartridge is place in an inverted position with respect tot the phonograph record player tone arms, with the plate being connected to the output phonograph cartridge for vibration thereby in accordance with said input signals.

9. The combination according to claim 3 wherein the coupling means includes amplifier means, and further including a generator operated by the rotation of the record turntable for supplying operating power to the amplifier means.

10. The combination according to claim 9 wherein the generator includes an alternately magnetized ring on the driven turntable means and further includes a pickup coil mounted at a fixed location in the housing and positioned to be responsive to the changes in the magnetic field of the magnetized ring passing by said fixed location when the driven turntable means is rotated for producing an alternating voltage used as the source of power for operating said amplifier means.

11. The combination according to claim 10 further including rectifier means responsive to the alternating voltage for producing a DC operating voltage for the amplifier means.

* * * * *